United States Patent
Hasebe (10) Patent No.: US 10,339,628 B2
(45) Date of Patent: Jul. 2, 2019

(54) IMAGE PROCESSING APPARATUS, IMAGE PROCESSING METHOD AND COMPUTER READABLE MEDIUM

(71) Applicant: Konica Minolta, Inc., Tokyo (JP)

(72) Inventor: Takashi Hasebe, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/800,544

(22) Filed: Jul. 15, 2015

(65) Prior Publication Data
US 2016/0042492 A1  Feb. 11, 2016

(30) Foreign Application Priority Data
Aug. 5, 2014  (JP) .................................. 2014-159711

(51) Int. Cl.
*G06T 3/00* (2006.01)
*H04N 1/405* (2006.01)
*H04N 1/32* (2006.01)

(52) U.S. Cl.
CPC ....... *G06T 3/0056* (2013.01); *H04N 1/32224* (2013.01); *H04N 1/32251* (2013.01); *H04N 1/4052* (2013.01)

(58) Field of Classification Search
None
See application file for complete search history.

(56) References Cited

U.S. PATENT DOCUMENTS

| | | | | |
|---|---|---|---|---|
| 6,275,303 B1* | 8/2001 | Fukaya | .............. | H04N 1/40075 358/1.9 |
| 2002/0075372 A1* | 6/2002 | Nagumo | .............. | G06K 15/128 347/131 |
| 2004/0125409 A1* | 7/2004 | Yamaguchi | ........ | H04N 1/40062 358/2.1 |
| 2006/0034483 A1* | 2/2006 | Au | ........................ | G06T 1/0028 382/100 |
| 2007/0146794 A1* | 6/2007 | Ahmed | .................. | G06K 15/02 358/3.06 |

(Continued)

FOREIGN PATENT DOCUMENTS

| | | |
|---|---|---|
| JP | H6-30266 | 2/1994 |
| JP | 09-051438 | 2/1997 |

(Continued)

OTHER PUBLICATIONS

Japan Patent Office, Notification of Reasons for Refusal in Application No. 2014-159711, dated Oct. 4, 2016, with Englist translation; 15 pages.

*Primary Examiner* — Aaron M Richer
(74) *Attorney, Agent, or Firm* — Squire Patton Boggs (US) LLP (57) ABSTRACT

An image processing apparatus including: a pattern detecting section which detects a specific pattern in an image; an image holding section which holds the image; an image conversion section which converts a pattern in the image into a pattern different from the specific pattern; and an output switching section which outputs an image having the pattern converted by the image conversion section for a region where the specific pattern is detected by the pattern detecting section, and outputs the image held by the image holding section for a region where the specific pattern is not detected.

25 Claims, 4 Drawing Sheets

(56) References Cited

U.S. PATENT DOCUMENTS

2007/0165281 A1* 7/2007 Agrawal ............ H04N 1/40062
358/3.03
2011/0044558 A1* 2/2011 Clediere ................ G06T 5/20
382/275

FOREIGN PATENT DOCUMENTS

| JP | 10-013685 | 1/1998 |
| JP | H11-177817 | 7/1999 |
| JP | 2005-260333 | 9/2005 |

\* cited by examiner

IMAGE PROCESSING APPARATUS, IMAGE PROCESSING METHOD AND COMPUTER READABLE MEDIUM

BACKGROUND OF THE INVENTION

1. Field of the Invention

The present invention relates to an image processing apparatus, an image processing method and a computer readable medium.

2. Description of Related Art

The spread of cloud computing has enabled arbitrary output of images uploaded in clouds by output apparatuses connected to the respective clouds.

In an environment in which such cloud can be used, the output characteristic of an output apparatus to output an image is not certain when the image is generated. Since it is not possible to generate an image corresponding to the output characteristic of the output apparatus, there have been cases where the image cannot be reproduced sufficiently and the output image has unintended image quality depending on the output characteristic.

Especially, image information is lost when images are generated by converting color images into monochrome images and further performing binarization. Thus, the images have a tendency to have unintended image quality when the images are output.

For example, when a color image of three colors R (red), G (green) and B (blue) is converted into a monochrome image, a grayscale monochrome image is generated by using only the image of green color in order to perform the processing rapidly in some cases. In this case, since two color images among the three color images are discarded, the image information is reduced to one-third. Furthermore, since binarization is performed to convert the image having the data amount of 8 bit for one pixel, for example, into an image of 1 bit, the image information is further reduced to one-eighth.

Also in a case of generating an image in JPEG format, since the JPEG format is lossy compression and generates the loss of image information, the output image is likely to have unintended image quality.

In addition, since the image in JPEG format is generated via discrete cosine transform (DCT) by the block unit of 8×8 pixels, a regular pattern of isolated pixels is likely to be generated by the block unit of 8×8 pixels. Depending on the output characteristic of the output apparatus, there have been cases where the isolated pixels cannot be reproduced sufficiently and the output image has low reproducibility for low gradation portions.

Generally, in order to improve gradation properties of images, the images are output by performing tone correction (see Japanese Patent Application Laid Open Publication No. H10-13685 for example), image processing according to the type of halftone image (see Japanese Patent Application Laid Open Publication No. H9-51438, for example), and such like.

However, an object of general tone correction is to correct gradation so that the gradation characteristic of the output image match the intended gradation characteristic, and thus, the change of image pattern itself is not intended. Since the image pattern after tone correction is not necessarily a pattern reproducible by the output apparatus, the user cannot necessarily reproduce the image with intended image quality.

SUMMARY OF THE INVENTION

An object of the present invention is to prevent decrease in image reproducibility due to the output characteristic of an output apparatus.

In order to achieve the above object, according to the first aspect of a preferred embodiment of the present invention, there is provided an image processing apparatus including: a pattern detecting section which detects a specific pattern in an image; an image holding section which holds the image; an image conversion section which converts a pattern in the image into a pattern different from the specific pattern; and an output switching section which outputs an image having the pattern converted by the image conversion section for a region where the specific pattern is detected by the pattern detecting section, and outputs the image held by the image holding section for a region where the specific pattern is not detected.

According to the second aspect of a preferred embodiment of the present invention, there is provided an image processing method, comprising: holding an image in an image holding section; detecting a specific pattern in the image; converting a pattern in the image into a pattern different from the specific pattern; and outputting an image having the pattern converted in the converting for a region where the specific pattern is detected in the detecting, and outputting the image held in the image holding section for a region where the specific pattern is not detected.

According to the third aspect of a preferred embodiment of the present invention, there is provided a non-transitory computer readable medium which includes an instruction for making a computer execute an image processing method, the method comprising: holding an image in an image holding section; detecting a specific pattern in the image; converting a pattern in the image into a pattern different from the specific pattern; and outputting an image having the pattern converted in the converting for a region where the specific pattern is detected in the detecting, and outputting the image held in the image holding section for a region where the specific pattern is not detected.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of an image processing apparatus, an image processing method and a computer readable medium of the present invention will be described with reference to the drawings.

Figure 1:
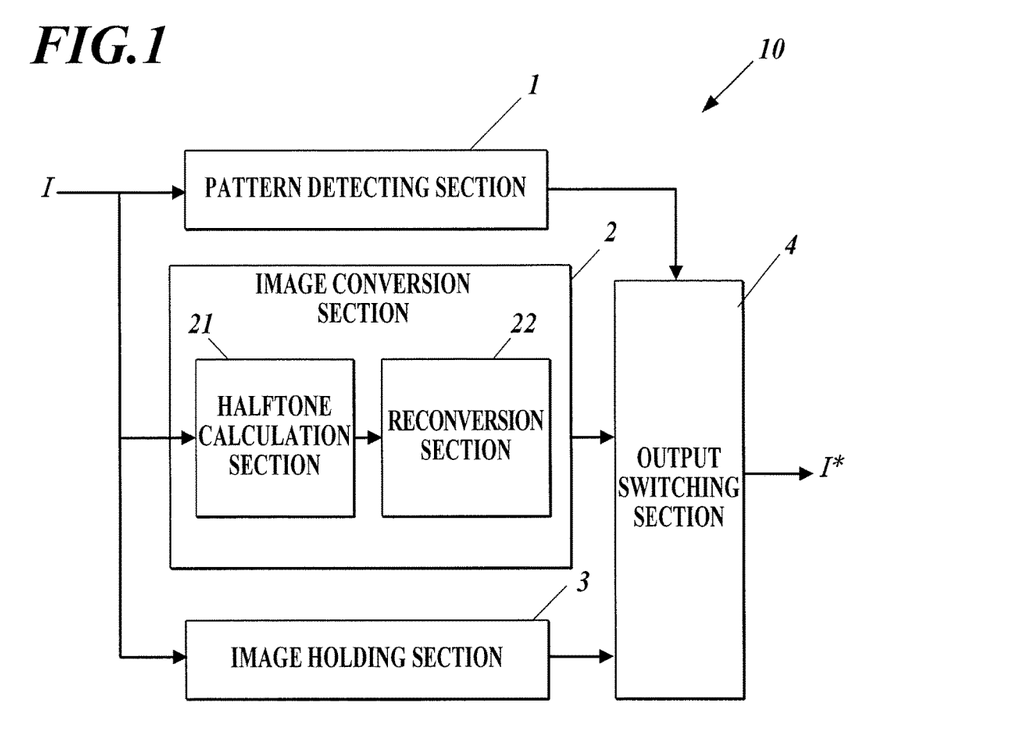
FIG. 1 is a block diagram showing a configuration of an image processing apparatus according to an embodiment of the present invention.

FIG. 1 is a block diagram showing a functional configuration of an image processing apparatus 10 according to the embodiment of the present invention.

The image processing apparatus 10 inputs an image I, performs image processing, and thereby outputs an image I*. The image I is a binary, that is, two-tone image.

The image processing apparatus 10 can be installed into an output apparatus or installed into a print controller or the like which generates an image from data described in page description language (PDL) by rasterizing processing and transfers the image to the output apparatus.

As shown in FIG. 1, the image processing apparatus 10 includes a pattern detecting section 1, an image conversion section 2, an image holding section 3 and an output switching section 4. Such image processing apparatus 10 can be configured by using an electronic circuit such as ASIC (Application Specific Integrated Circuit) and FPGA (Field-Programmable Gate Array), for example.

The pattern detecting section 1 detects a specific pattern in the input image I.

Specifically, the pattern detecting section 1 inputs the image I by the unit of m×n pixels (each of the m and n is a natural number of three or more), and collates each of the m×n pixel patterns with a specific pattern. As a result of the collation, if an m×n pixel pattern matches the specific pattern, the pattern detecting section 1 generates a signal indicating that the pixels of the m×n pixels are the region where the specific pattern was detected. If the m×n pixel pattern does not match the specific pattern, the pattern detecting section 1 generates a signal indicating that the pixels of the m×n pixels are not the region where the specific pattern was detected. Then, the pattern detecting section 1 outputs the signal to the output switching section 4.

The specific pattern is a pattern for which the image reproducibility is predicted to be lowered due to the output characteristic of the output apparatus for the image. For example, in a case where the output apparatus has the output characteristic of low reproducibility for isolated pixels, the specific pattern is a pattern of isolated pixels.

Figure 2:
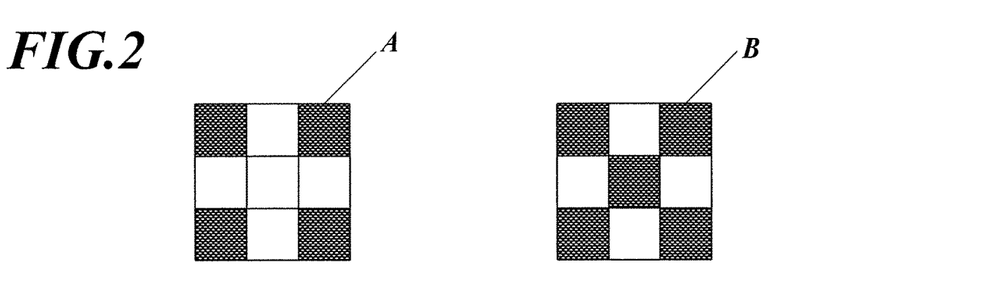
FIG. 2 is a view illustrating patterns of isolated pixels.

FIG. 2 illustrates patters of isolated pixels.

As shown in FIG. 2, each of the patterns A and B is a 3×3 pixel pattern formed of black pixels and white pixels, each of the black pixels being adjacent to white pixels and isolated. The black pixel is a pixel of maximum tone and the white pixel is a pixel of minimum tone among the two tones.

In a case where patterns A and B of such isolated pixels are detected as specific patterns, the pattern detecting section 1 collates the image I with the patterns A and B by the 3×3 pixel unit. With respect to 3×3 pixels which matches the pattern A or pattern B, the pattern detecting section 1 outputs a signal indicating that the 3×3 pixels are the region where an isolated pixel pattern was detected.

The image conversion section 2 converts a pattern of the input image I into a pattern different from the specific patterns.

Since the converted pattern is different from the specific patterns, it is possible to prevent the decrease in reproducibility of an image output by the output apparatus which has the output characteristic of low reproducibility for the specific patterns. In order to improve the image reproducibility more, it is preferable that the converted pattern can be reproduced sufficiently even by the output characteristic of the output apparatus.

For example, when the output apparatus has the output characteristic of low reproducibility for isolated pixels, it is preferable that the image conversion section 2 converts each of the isolated pixel patterns into a screen pattern formed of dots which are aggregated black pixels. Such screen pattern is called an AM screen pattern (amplitude modulation pattern), and can be reproduced sufficiently even when the output apparatus has the output characteristic of low reproducibility for isolated pixels since the AM screen pattern has less isolated pixels.

For pattern conversion, as shown in FIG. 1, the image conversion section 2 includes a halftone calculation section 21 which calculates the halftone level of each pixel in the input image I and a reconversion section 22 which converts the halftone level into a tone value in the same gradation number (number of gradations) as that of the image I according to the result of comparing the halftone level with a threshold value.

The halftone calculation section 21 calculates the halftone level of each pixel by the tone values of M×N pixels (each of the M and N is a natural number of three or more) including the pixel at the center.

Since the image I is a two-tone image, the halftone calculation section 21 can calculate the number of black pixels in the M×N pixels having the target pixel at the center as the halftone level of the target pixel in the M×N level. The number of white pixels can also be the halftone level instead of the number of black pixels.

It is preferable that the size of M×N pixels is the same as the size of m×n pixels of the specific pattern detected by the pattern detecting section 1 since it becomes easy to set the input/output timing of image and to design hardware such as the number of line buffers to be included.

The reconversion section 22 converts the halftone level of each pixel calculated by the halftone calculation section 21 into a tone value in the same gradation number as that of the original image I according to the result obtained by comparing the halftone level with the threshold value.

Though a uniform threshold value can be used for each of the pixels, if a threshold value table of systematic dithering method is used, the pattern of image I can be converted into the screen pattern. In the threshold value table, a threshold value is determined for each pixel of L×K pixels (each of L and K is a natural number). The reconversion section 22 collates the image I with the threshold value table by the unit of L×K pixels, compares the halftone level of each pixel with each threshold value in the threshold value table, and converts the halftone level into a tone value in two gradations which are the same gradation number as that of the original image I. Since the screen pattern can reproduce the halftones by the gradation number of L×K which is larger than the gradation number of the original image I in a pseudo manner, the reproducibility of gradation of the original image I is improved. In addition, by adjusting the threshold value in the threshold value table, conversion into the AM screen pattern can be performed easily, and the number of lines, the angle and such like of the screen lines can also be adjusted. Thus, the image quality can be adjusted easily.

Figure 3:
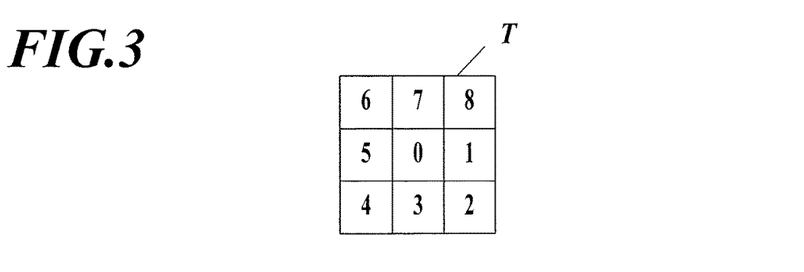
FIG. 3 is a view illustrating a threshold value table.

FIG. 3 illustrates a threshold value table of 3×3 pixels.

As shown in FIG. 3, in the threshold value table T, threshold values of 0 to 8 are set to the respective pixels of the 3×3 pixels so that the threshold value increases in whorl from the center in order to convert a pattern in the image into the AM screen pattern formed of dots which are aggregated black pixels.

The reconversion section 22 compares the halftone level of each pixel in the unit of 3×3 pixels with each threshold value in the 3×3 pixels in the threshold value table T. If the halftone level is the threshold value or more, the halftone level is converted into the tone value of maximum tone. If the halftone level is less than the threshold value, the halftone level is converted into the tone value of minimum tone.

For example, in the binary pattern A shown in FIG. 2, there are four black pixels among the 3×3 pixels, and thus, the halftone level of the central pixel is level 4 among 9 levels. In a case where the pattern A is collated with the threshold value table T of 3×3 pixels shown in FIG. 3 in order to convert the halftone level into a tone value in a binary value similar to the original pattern A, that is, in the gradation number of 2, the threshold value in the threshold value table T corresponding to the central pixel of the pattern A is 0. Since the halftone level 4 of the central pixel is more than the threshold value 0, the halftone level is converted into the tone value of maximum tone among the two tones. Though the tone value of each pixel converted by using the threshold value table T is two tones, nine tones of halftones can be reproduced in pseudo manner by using the threshold value table T.

By setting a plurality of threshold values which are different in stepwise manner to respective pixels in L×K pixels of the threshold value table, the halftones can also be converted into tone values of multiple tones.

In order to prevent the recurrence of isolated pixels, it is preferable that the size of L×K pixels of the threshold value table is larger than the size of m×n pixels of the pattern detected by the pattern detecting section 1. If the threshold value table is larger, it is possible to increase the gradation number of halftones which can be expressed in pseudo manner.

The image holding section 3 holds the input image I to delay the output of the image I to the output switching section 4. The image holding section 3 outputs the image I to the output switching section 4 at the timing when the image having the pattern converted by the image conversion section 2 is output to the output switching section 4.

A FIFO (Fast-In-Fast-Out) memory or such like can be used as the image holding section 3, for example.

The output switching section 4 specifies a region in the image I where the specific pattern was detected by a signal input from the pattern detecting section 1. As for the region where the specific pattern was detected by the pattern detecting section 1, the output switching section 4 selects and outputs the image having the pattern converted by the image conversion section 2. As for a region where the specific pattern was not detected, the output switching section 4 selects and outputs the image I held by the image holding section 3. Thus, the output switching section 4 outputs an image I* in which only the specific pattern region is converted into a different pattern.

In a case where the region where the specific pattern was detected is a character region, the output switching section 4 can also select and output the original image I held by the image holding section 3 so as not to perform pattern conversion. Thus, it is possible to prevent deterioration in the image quality such as shaky or blurring edges of character due to the pattern conversion and improve reproducibility of the original character image having high sharpness.

In a case where the character region is excluded from the target of pattern conversion, a character detecting section is provided to detect character patterns in the image I, and a signal indicating whether the region is a character region or not is output from the character detecting section to the output switching section 4. The output switching section 4 specifies the character region in the image according to the signal from the character detecting section, and selects the image I for the character region even if the region is a specific pattern region. Alternatively, attribute information may be input to the output switching section 4 since the attribute information is generated and tagged to the image in some cases, the attribute information representing the attribute of image for each pixel by classifying the attribute into any one of character (Text), figure (Graphics) and photograph (Image). The output switching section 4 can specify, as the character region, the region represented as the attribute of character by the attribute information, and select the image I.

Figure 4:
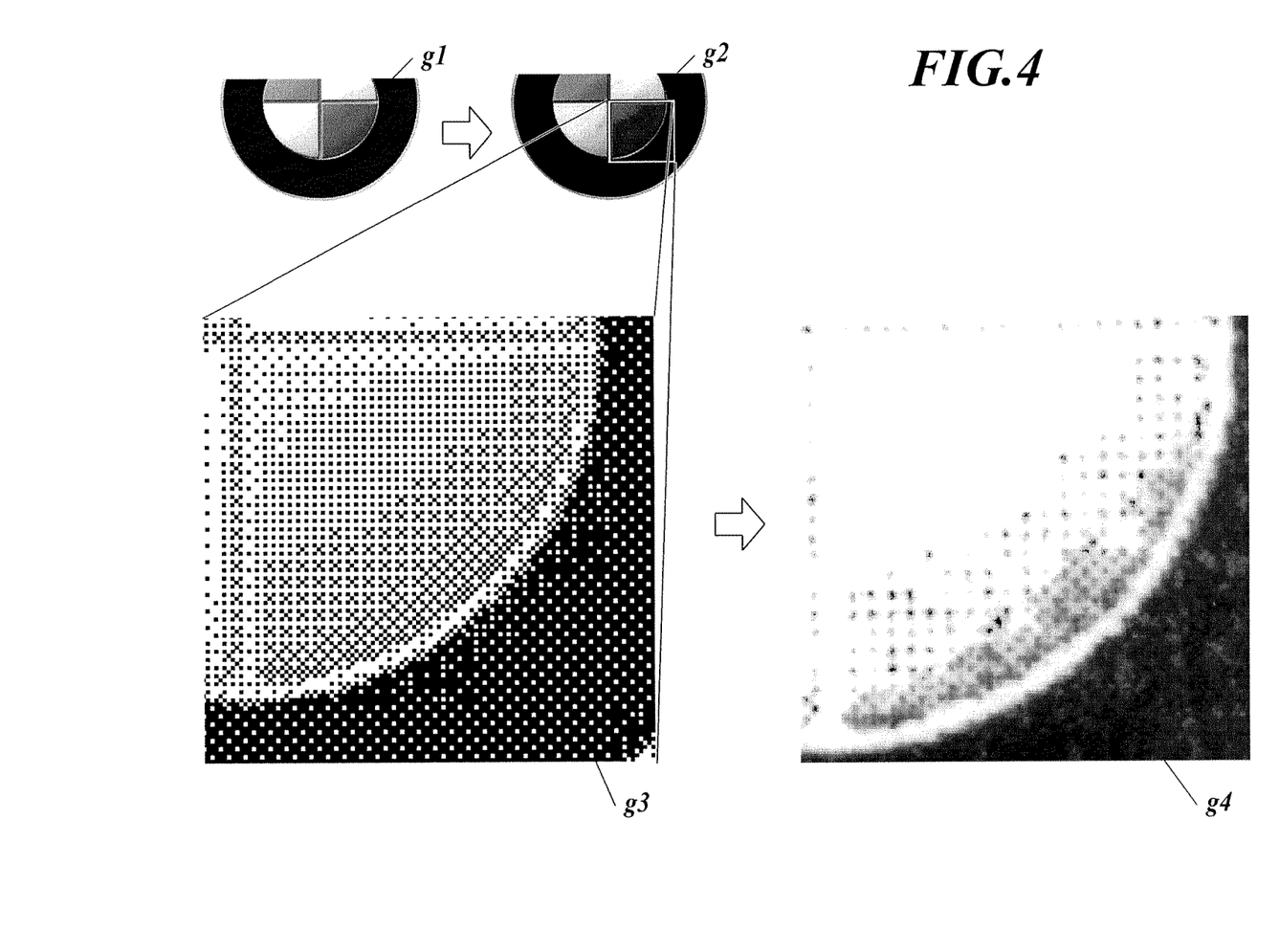
FIG. 4 is a view showing an output example of an image including patterns of isolated pixels.

FIG. 4 shows an output example of a case where the isolated pixel patterns are output without image processing.

As shown in FIG. 4, a color image g1 in JPEG format is generated as a monochrome image g2 by converting the color scale of three colors into the gray scale of one color and thereafter converting from 256 tones to two tones.

In FIG. 4, the monochrome image g3 is an image representing a part of the monochrome image g2 which is enlarged. Since DCT conversion was performed by the block unit of 8×8 pixels at the conversion into JPEG format, the monochrome image g3 has isolated pixel patterns. In an electrophotographic output apparatus which has output characteristic that exposure light source has binary responsiveness to photoreceptors for attaching toners to the photoreceptors, when the monochrome image g3 is output, a monochrome image g4 with low reproducibility of isolated pixels is obtained. Since the reproducibility of isolated pixels in the monochrome image g4 is low, low gradation cannot be reproduced and the gradation property is low compared to the original color image g1.

Figure 5:
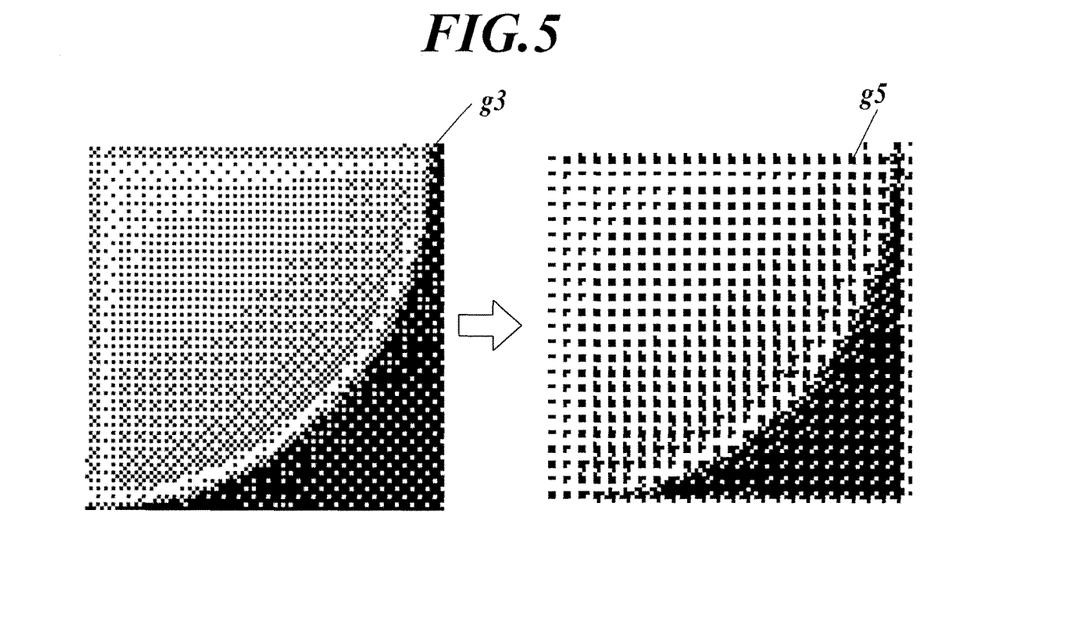
FIG. 5 is a view showing an image obtained by converting isolated pixel patterns in the image into AM screen patterns.

On the other hand, by the image processing apparatus 10 converting the isolated pixel patterns in the monochrome image g3 into AM screen patterns, the monochrome image g5 as shown in FIG. 5 is obtained. In the monochrome image g5, even a low gradation image portion has less isolated pixels and the dots can be output continuously. Thus, even in the electrophotographic output apparatus which has output characteristic that exposure light source has binary responsiveness to photoreceptors for attaching toners to the photoreceptors, low gradation can be reproduced and the gradation similar to that of the original color image g1 can be reproduced.

In a case where the output apparatus of the image has low reproducibility for thin lines, and characters with small font sizes blur, by performing the conversion into a pattern having high reproducibility of characters, it is possible to improve the reproducibility of characters. For example, patterns of characters having small font sizes of approximately 3 to 5 points are detected as specific patterns, and the patterns are output by being converted into screen patterns having many screen lines, for example. Thereby, it is possible to provide an image having high reproducibility of edges of characters and high sharpness.

As described above, the image processing apparatus 10 in the embodiment includes a pattern detecting section 1 which detects a specific pattern in the image I, an image holding section 3 which holds the image I, an image conversion section 2 which converts the pattern of image I into a pattern different from the specific pattern, and an output switching section 4 which outputs an image having the pattern converted by the image conversion section 2 for the region where the specific pattern was detected by the pattern detecting section, and outputs the image I held by the image holding section 3 for the region where the specific pattern was not detected.

Thus, it is possible to output the image I* obtained by converting the specific pattern in the image I into a different pattern and maintaining the image portion other than the specific pattern to be the original image I. In a case of outputting the image I* by the output apparatus having output characteristic of low reproducibility for the specific pattern, it is possible to avoid the output of specific pattern and prevent the decrease in image reproducibility.

Especially, in a case where the specific pattern is an isolated pixel pattern, by converting the pattern into the AM screen pattern as described above, it is possible to reproduce the gradation similar to that of the original image I even by the output apparatus having low reproducibility of isolated pixels.

The above embodiment is a preferred example of the present invention, and the present invention is not limited to this. Changes can be appropriately made within the scope of the present invention.

For example, the processing contents of the image processing apparatus 10 can be achieved by software. Below is the explanation of example in which a print controller performs the sane image processing as that of image processing apparatus 10 by software; however, image processing by software can also be performed similarly by an output apparatus, computer terminal which performs image processing and such like.

Figure 6:
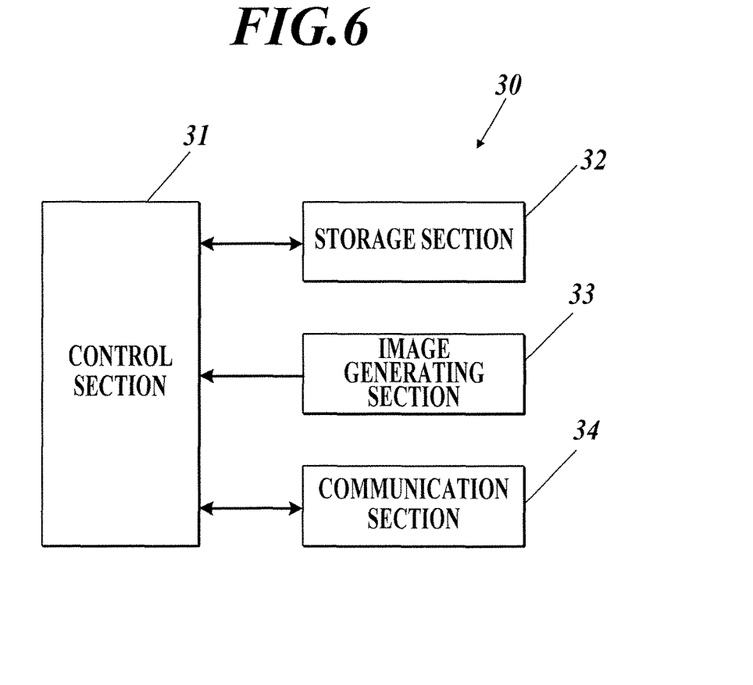
FIG. 6 is a block diagram showing a configuration of a print controller.

As shown in FIG. 6, a print controller 30 includes a control section 31, storage section 32, image generating section 33, communication section 34 and such like. The control section 31 includes a SoC (System on a Chip) or CPU (Central Processing Unit), RAM (Random Access Memory) and such like, and can execute image processing similar to that of the image processing apparatus 10 by reading out and executing a program for image processing stored in the storage section 32.

Figure 7:
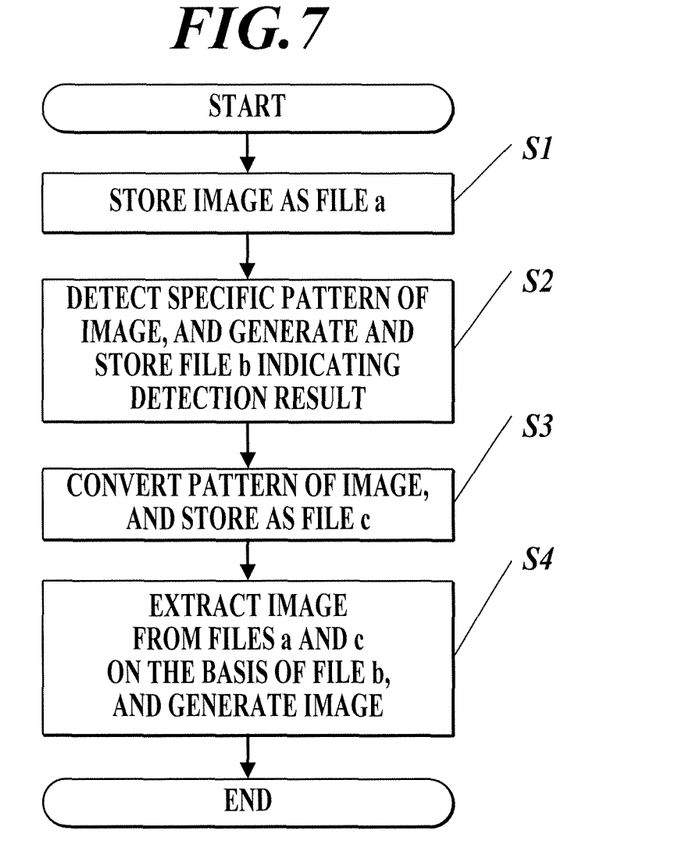
FIG. 7 is a flow chart showing a processing procedure when the print controller executes image processing.

FIG. 7 shows a processing procedure when the control section 31 executes the image processing.

When the print controller 30 receives data described in page description language from a user terminal on a network via the communication section 34, the print controller 30 performs rasterizing processing with the image generating section 33 and generates an image I in bitmap form. When the image I in bitmap form is generated, the image I is transferred to the control section 31. As shown in FIG. 7, the control section 31 stores the input image I as a "file a" in the storage section 32 (step S1).

On the other hand, the control section 31 detects a specific pattern in the input image I, generates a "file b" formed of a signal indicating whether or not the specific pattern was detected for each pixel, and stores the file b in the storage section 32 (step S2).

The control section 31 converts the pattern of input image I into a pattern different from the specific pattern, and stores the image after conversion as a "file c" in the storage section 32 (step S3).

Since the detection of specific pattern and conversion of pattern can be performed similarly to the above mentioned pattern detecting section 1 and the image conversion section 2, detailed explanation is omitted.

Next, the control section 31 reads out the files a to c from the storage section 32, and specifies a region where the specific pattern was detected and a region where the specific pattern was not detected by the file b. The control section 31 extracts the image of region where the specific pattern was detected from the file c, extracts the image of region where the specific pattern was not detected from the file a, and combine them to generate the image I* (step S4).

As a computer readable medium of the program for image processing, a ROM, a non-volatile memory such as a flash memory, and a portable recording medium such as a CD-ROM can be applied. A carrier wave can also be applied as a medium providing the above program data via the communication line.

The entire disclosure of Japanese Patent Application No. 2014-159711 filed on Aug. 5, 2014 including description, claims, drawings, and abstract are incorporated herein by reference in its entirety.

What is claimed is:

1. An image processing apparatus comprising:
    a hardware processor that
    detects an isolated pixel pattern at multiple locations in an original image, some of the multiple locations being adjacent to each other and some of the multiple locations are not adjacent to each other, each black pixel in the isolated pixel pattern having sides that are adjacent to a white pixel and isolated such that the sides do not adjoin a side of another black pixel in the isolated pixel pattern, and
    outputs a converted image in which the isolated pixel pattern, at each of the multiple locations in the original image, has been converted to a different pattern that is different from the isolated pixel pattern, wherein the different pattern is the same at the multiple locations in the original image, and black pixels in the different pattern are aggregated such that a side of each black pixel in the different pattern adjoins a side of another black pixel,
    wherein the hardware processor detects the isolated pixel pattern by a unit of M×N pixels and converts the isolated pixel pattern into the different pattern by the unit of detected M×N pixels, and the hardware processor includes any of an application specific integrated circuit, a field-programmable gate array, and a processor running software, wherein each of M and N is a natural number of three or more, and
    wherein the hardware processor outputs the converted image in which only the isolated pixel pattern, at each of the multiple locations in the original image, has been converted to the different pattern.

2. The image processing apparatus according to claim 1, wherein the hardware processor outputs the converted image by:
    calculating a halftone level of each pixel in the isolated pixel pattern by tone values of M×N pixels including the pixel for which the halftone level is being calculated as a center; and
    converting the calculated halftone level into a tone value in a same gradation number as a gradation number of the original image according to a result obtained by comparing the halftone level with a threshold value.

3. The image processing apparatus according to claim 2, wherein the M×N pixels have a same size as the isolated pixel pattern.

4. The image processing apparatus according to claim 1, wherein the hardware processor does not convert the isolated pixel pattern into the different pattern when the isolated pixel pattern is included in a character region.

5. The image processing apparatus according to claim 1, wherein
    the hardware processor outputs a non-converted image of a region in the original image, wherein the isolated pixel pattern is not detected in the region.

6. The image processing apparatus according to claim 5, wherein the hardware processor delays output of the non-converted image of the region of the original image and outputs the non-converted image at a timing when a converted image of the region of the original image would have been output had the isolated pixel pattern been detected in region of the original image.

7. The image processing apparatus according to claim 1, wherein the original image is a two-tone image and the converted image is another two-tone image.

8. The image processing apparatus according to claim 7, wherein the hardware processor outputs the converted image by:
converting the isolated pixel pattern into a multivalued image based on tone values of M×N pixels including each pixel of the isolated pixel pattern at the center,
collating the multivalued image with a threshold value table by the unit of M×N pixels, the threshold value table being a table in which a threshold value is determined for each pixel of M×N pixels,
comparing tone values of pixels in the multivalued image with respective threshold values in the threshold value table, and
converting the multivalued image into the converted image based on a result of the comparing of tone values with respective threshold values.

9. The image forming apparatus according to claim 8, wherein the threshold values are set to respective pixels of the M×N pixels so that the threshold value increases in whorl from the center of the threshold value table.

10. The image processing apparatus according to claim 1, wherein the isolated pixel pattern includes a first white pixel having a side that adjoins an upper side of a black pixel in the isolated pixel pattern, a second white pixel having a side that adjoins a lower side of the black pixel, a third white pixel having a side that adjoins a left side of the black pixel, and a fourth white pixel having a side that adjoins a right side of the black pixel.

11. The image processing apparatus according to claim 1, wherein black pixels in the isolated pixel pattern are arranged continuously in diagonal directions such that each of the black pixels has at least one corner that adjoins a corner of another one of the black pixels.

12. The image processing apparatus according to claim 1, wherein, when the hardware processor converts the isolated pixel pattern to the different pattern, the hardware processor calculates a halftone level for each pixel included in the isolated pixel pattern by a number of black pixels in the M×N pixels having the pixel for which the halftone level is being calculated as a center.

13. An image processing method, comprising:
detecting an isolated pixel pattern at multiple locations in an original image, some of the multiple locations being adjacent to each other and some of the multiple locations are not adjacent to each other, each black pixel in the isolated pixel pattern having sides that are adjacent to a white pixel and isolated such that the sides do not adjoin a side of another black pixel in the isolated pixel pattern, and
outputting a converted image in which only the isolated pixel pattern, at each of the multiple locations in the original image, has been converted to a different pattern that is different from the isolated pixel pattern, wherein the different pattern is the same at the multiple locations in the original image, and black pixels in the different pattern are aggregated such that a side of each black pixel in the different pattern adjoins a side of another black pixel,
wherein the detecting of the isolated pixel pattern is by a unit of M×N pixels, and the isolated pixel pattern is converted into the different pattern by the unit of detected M×N pixels, wherein each of M and N is a natural number of three or more.

14. A non-transitory computer readable medium which includes an instruction for making a computer execute an image processing method, the method comprising:
detecting an isolated pixel pattern at multiple locations in an original image, some of the multiple locations being adjacent to each other and some of the multiple locations are not adjacent to each other, each black pixel in the isolated pixel pattern having sides that are adjacent to a white pixel and isolated such that the sides do not adjoin a side of another black pixel in the isolated pixel pattern, and
outputting a converted image in which only the isolated pixel pattern, at each of the multiple locations in the original image, has been converted to a different pattern that is different from the isolated pixel pattern, wherein the different pattern is the same at the multiple locations in the original image, and black pixels in the different pattern are aggregated such that a side of each black pixel in the different pattern adjoins a side of another black pixel,
wherein the detecting of the isolated pixel pattern is by a unit of M×N pixels, and the isolated pixel pattern is converted into the different pattern by the unit of detected M×N pixels, wherein each of M and N is a natural number of three or more.

15. The non-transitory computer readable medium of claim 14, wherein outputting the converted image includes:
calculating a halftone level of each pixel in the isolated pixel pattern by tone values of M×N pixels including the pixel for which the halftone level is being calculated as a center; and
converting the calculated halftone level into a tone value in a same gradation number as a gradation number of the original image according to a result obtained by comparing the halftone level with a threshold value.

16. The non-transitory computer readable medium of claim 15, wherein the M×N pixels have a same size as the isolated pixel pattern.

17. The non-transitory computer readable medium of claim 14, wherein the method further comprises determining whether the isolated pixel pattern is in a character region, and the isolated pixel pattern is converted to the different pattern only on condition that the isolated pixel pattern is not in a character region.

18. The non-transitory computer readable medium of claim 14, wherein the method further comprises outputting a non-converted image of a region in the original image, wherein the isolated pixel pattern is not detected in the region.

19. The non-transitory computer readable medium of claim 18, wherein outputting of the non-converted image is delayed and is performed at a time when a converted image of the region of the original image would have been output had the isolated pixel pattern been detected in the region of the original image.

20. The non-transitory computer readable medium of claim 14, wherein the original image is a two-tone image and the converted image is another two-tone image.

21. The non-transitory computer readable medium of claim 20, wherein outputting of the converted image includes:
converting the isolated pixel pattern into a multivalued image based on tone values of M×N pixels including each pixel of the isolated pixel pattern at the center, collating the multivalued image with a threshold value table by the unit of M×N pixels, the threshold value table being a table in which a threshold value is determined for each pixel of M×N pixels, comparing tone values of pixels in the multivalued image with respective threshold values in the threshold value table, and converting the multivalued image into the converted image based on a result of the comparing of tone values with respective threshold values.

22. The non-transitory computer readable medium according to claim 21, wherein the threshold values are set to respective pixels of the M×N pixels so that the threshold value increases in whorl from the center of the threshold value table.

23. The non-transitory computer readable medium of claim 14, wherein the isolated pixel pattern includes a first white pixel having a side that adjoins an upper side of a black pixel in the isolated pixel pattern, a second white pixel having a side that adjoins a lower side of the black pixel, a third white pixel having a side that adjoins a left side of the black pixel, and a fourth white pixel having a side that adjoins a right side of the black pixel.

24. The non-transitory computer readable medium of claim 14, wherein black pixels in the isolated pixel pattern are arranged continuously in diagonal directions such that each of the black pixels has at least one corner that adjoins a corner of another one of the black pixels.

25. The non-transitory computer readable medium according to claim 14, wherein, when the isolated pixel pattern is converted to the different pattern, a halftone level is calculated for each pixel included in the isolated pixel pattern by a number of black pixels in the M×N pixels having the pixel for which the halftone level is being calculated as a center.

* * * * *